US010082159B2

(12) United States Patent
Vigholm et al.

(10) Patent No.: US 10,082,159 B2
(45) Date of Patent: Sep. 25, 2018

(54) TWIN PRIORITY VALVE

(71) Applicant: VOLVO CONSTRUCTION EQUIPMENT AB, Eskilstuna (SE)

(72) Inventors: Bo Vigholm, Stora Sundby (SE); Andreas Ekvall, Hallstahammar (SE)

(73) Assignee: Volvo Construction Equipment AB, Eskilstuna (SE)

( * ) Notice: Subject to any disclaimer, the term of this patent is extended or adjusted under 35 U.S.C. 154(b) by 700 days.

(21) Appl. No.: 14/430,564

(22) PCT Filed: Sep. 28, 2012

(86) PCT No.: PCT/SE2012/000149
§ 371 (c)(1),
(2) Date: Mar. 24, 2015

(87) PCT Pub. No.: WO2014/051472
PCT Pub. Date: Apr. 3, 2014

(65) Prior Publication Data
US 2015/0275932 A1 Oct. 1, 2015

(51) Int. Cl.
*F15B 11/16* (2006.01)
*F15B 11/17* (2006.01)
(Continued)

(52) U.S. Cl.
CPC .............. *F15B 11/17* (2013.01); *B62D 5/075* (2013.01); *E02F 9/0841* (2013.01); *E02F 9/225* (2013.01);
(Continued)

(58) Field of Classification Search
CPC ....... F15B 11/162; F15B 11/17; F15B 11/161; F15B 13/022; E02F 9/2225; E02F 9/2292;
(Continued)

(56) References Cited

U.S. PATENT DOCUMENTS 4,044,786 A * 8/1977 Yip ....................... F15B 11/162
137/101
4,453,451 A 6/1984 Streeter et al.
(Continued)

FOREIGN PATENT DOCUMENTS

| DE | 4108915 A1 | 9/1992 |
| WO | 9728374 A1 | 8/1997 |
| WO | 2011068441 A1 | 6/2011 |

OTHER PUBLICATIONS

Supplementary European Search Report (dated May 24, 2016) for corresponding European App. EP 12 88 5362.
(Continued)

*Primary Examiner* — F. Daniel Lopez
*Assistant Examiner* — Abiy Teka
(74) *Attorney, Agent, or Firm* — WRB-IP LLP

(57) ABSTRACT

A hydraulic system for a work machine including a first and a second hydraulic actuator, and a first and a second hydraulic machine for providing hydraulic fluid to at least one of the first and the second actuator via a first and a second priority valve, respectively. The first and second priority valves are controlled by a pressure drop ΔP over the inlet valve of the first actuator such that when ΔP is lower than a first threshold value T1, a flow of hydraulic fluid is allowed only to the first actuator. The second priority valve allows a flow of hydraulic fluid to both the first and second actuator for a pressure drop higher than T1. The first priority valve is further configured to allow a flow of hydraulic fluid to both of the first and second actuator for a pressure drop higher than a second threshold value T2 which is higher than T1.

19 Claims, 2 Drawing Sheets

(51) Int. Cl.
*B62D 5/07* (2006.01)
*E02F 9/08* (2006.01)
*E02F 9/22* (2006.01)
*F15B 13/02* (2006.01)

(52) U.S. Cl.
CPC .......... *E02F 9/2225* (2013.01); *E02F 9/2239* (2013.01); *E02F 9/2292* (2013.01); *F15B 11/161* (2013.01); *F15B 11/162* (2013.01); *F15B 13/022* (2013.01); *F15B 2211/20576* (2013.01); *F15B 2211/4053* (2013.01); *F15B 2211/781* (2013.01)

(58) Field of Classification Search
CPC ....... E02F 9/225; E02F 9/2239; E02F 9/0849; B62D 5/075
See application file for complete search history.

(56) References Cited

U.S. PATENT DOCUMENTS

2007/0227135 A1 10/2007 Kahlil
2013/0220425 A1* 8/2013 Pomeroy ............... E02F 9/2235
137/1

OTHER PUBLICATIONS

International Search Report (dated Jun. 3, 2013) for corresponding International App. PCT/SE2012/000149.

* cited by examiner

TWIN PRIORITY VALVE

BACKGROUND AND SUMMARY

The present invention relates to a hydraulic system for a working machine.

The invention is applicable, according to an aspect thereof on working machines within the fields of industrial construction machines, in particular wheel loaders. Although the invention will be described with respect to a wheel loader, the invention is not restricted to this particular machine, but may also be used in other working machines such as articulated haulers, excavators and backhoe loaders.

A working machine is provided with a bucket, container or other type of implement for lifting, carrying and/or transporting a load.

For example, a wheel loader has a load arm unit for raising and lowering the implement, such as a bucket. The load arm unit comprises a number of hydraulic cylinders for movement of the load arm and the implement attached to the load arm. A pair of hydraulic cylinders is arranged for lifting the load arm and a further hydraulic cylinder is arranged on the load arm for tilting the implement. The wheel loader which usually is frame-steered has also a pair of hydraulic cylinders for turning/steering the wheel loader by pivoting a front part and a rear part of the wheel loader relative to each other.

In addition to the hydraulic cylinders, the hydraulic system of the wheel loader preferably comprise a first pump (working cylinder pump) for providing, hydraulic fluid to the hydraulic cylinders of the load arm unit and a second pump (steering cylinder pump) for providing hydraulic, fluid to the steering cylinders. In order to optimize the hydraulic system and use the pumps in an effective way, the steering cylinder pump can also be used for providing hydraulic fluid to the hydraulic cylinders (working cylinders) of the load arm unit.

For both economic and environmental reasons, the fuel efficiency of a working machine is increasingly important. One way of increasing the fuel efficiency in a working machine comprising hydraulic actuators s to increase the efficiency of the hydraulic system. It is for example known that fixed displacement pumps have a higher efficiency compared to variable pumps. However, only partial flows of the fixed displacement pumps are used, the remaining flow may have to be dumped to a tank, thereby incurring losses in the system.

U.S. Pat. No. 4,044,786 attempts to alleviate the aforementioned problem by introducing a hydraulic system where a priority valve is connected to a fixed displacement pump so that the flow of the pump is distributed to more than one load circuit.

However, in the hydraulic system according to U.S. Pat. No. 4,044,786, there will be a delay in response in the transition from the first pump to the second pump when the flow demand of the primary load circuit is increased beyond what the first pump can provide. Such a delay will be noticed by the operator of the vehicle as a temporary reduction of response of the primary load circuit.

In view of the above-mentioned desired properties of a hydraulic system, it is desirable to provide an improved hydraulic system for a work machine and a method for controlling such a system.

In the present context, a priority valve should be understood as a hydraulic valve having an inlet for receiving hydraulic fluid from a hydraulic machine and two outlets for directing the received hydraulic fluid to two hydraulic actuators. The priority valve is configured to be controlled to provide hydraulic fluid exclusively to either of the actuators, or to provide hydraulic fluid simultaneously to both actuators at any ratio there between based on a received control signal.

The present invention is, according to an aspect thereof, based on the realization that an efficient hydraulic system may be achieved by using a first and a second priority valve for providing hydraulic fluid to a first and a second actuator, where both priority valves are controlled by a pressure drop over an inlet valve of the first actuator, thereby efficiently utilizing two hydraulic machines while prioritizing the first actuator.

According to an aspect of the present invention, the first and the second priority valves are both connected to the first and the second hydraulic, actuators, and the priority valves are controlled by a pressure drop detected over the inlet, valve of the first (prioritized) actuator such that if the pressure drop is below a first threshold value, both priority valves provide hydraulic fluid only to the first actuator. If the pressure drop exceeds the first threshold value, the second priority valve starts to provide a flow of hydraulic fluid also to the second actuator, and if the pressure drop exceeds a second threshold value, the first priority valve starts to provide a flow of hydraulic fluid to the second actuator.

In one embodiment of an aspect of the invention, the second priority valve may further be configured to allow a flow of hydraulic fluid only to the second actuator for a pressure drop higher than a third threshold value, and the first priority valve may further be configured to allow a flow of hydraulic fluid only to the second actuator for a pressure drop higher than a fourth threshold value, wherein the fourth threshold value is higher than the third threshold value. Furthermore, the third threshold value may advantageously be higher than the second threshold value. Thereby, the two priority valves have ranges which are overlapping when a change in pressure drop causes a transition from providing hydraulic fluid exclusively to either of the actuators to providing hydraulic fluid to both of the actuators, and vice versa. By configuring the priority valves such that the threshold values overlap, a smooth transition between the first actuator and the second actuator can be achieved.

According to one embodiment of an aspect of the invention, the first function may be a hydraulic steering system of the working machine and the second function may be a hydraulic work system of the working machine. Thus, the first actuator is an actuator for providing steering function and the second actuator is an actuator for providing a working function, such as for example a lift function, of the working machine. Consequently, in one embodiment of the invention, the steering function is the prioritized function of the hydraulic system. Thereby, the hydraulic system is arranged to provide power to the lift actuator as long as no or low power is required by the steering actuator, and to redirect power to the steering function when so required.

In one embodiment of the invention, the first hydraulic machine may advantageously be a first fixed displacement hydraulic pump and the second hydraulic machine may advantageously be a second fixed displacement hydraulic pump.

A fixed displacement pump is a hydraulic pump which cannot be adjusted to increase or decrease the amount of fluid that is moved in one pump cycle. By using fixed displacement pumps instead of variable displacement pumps a simpler, more robust, and relatively low cost system can be provided.

In one embodiment of an aspect of the invention, the second fixed displacement hydraulic pump may advantageously have a larger displacement than the first fixed displacement hydraulic pump. Thereby, the steering may be powered by the first pump having a smaller fixed displacement as long as the steering load is sufficiently low, for example for low steering speeds such as during transportation of the working machine.

According to one embodiment of an aspect of the invention, the first priority valve run comprise a first spring and the second priority valve may comprise a second spring, wherein a position of each of the springs controls the output of the corresponding priority valve such that when the spring is fully extended, a flow of hydraulic fluid is allowed only to the first actuator, and when the spring is fully compressed, a flow of hydraulic fluid is allowed only to the second actuator.

Furthermore, the compression of the first spring and the second spring is preferably controlled by the pressure drop over the inlet valve of the first actuator. Moreover, the first spring may be configured to be fully extended for a pressure drop lower than the second threshold value and fully compressed for a pressure drop higher than the fourth threshold value. The second spring can be configured to be fully extended for a pressure drop lower than the first threshold value and to be fully compressed for a pressure drop higher than the third threshold value.

According to a second aspect of the invention, there is also provided a method for controlling a hydraulic system comprising a first hydraulic machine for providing hydraulic fluid to at least one of a first actuator and a second actuator via a first priority valve and a second hydraulic machine for providing hydraulic fluid to at least one of the first actuator and the second actuator via a second priority valve, the first hydraulic actuator being provided with an inlet valve, the method comprising: controlling each of the first priority valve and the second priority valve to allow a flow of hydraulic fluid only to the first actuator if a pressure drop over the inlet valve of the first actuator is below a first threshold value; controlling the second priority valve to allow a flow of hydraulic fluid to both of the first actuator and the second actuator for a pressure drop higher than the first threshold value; controlling the first priority valve to allow a flow of hydraulic fluid to both of the first actuator and the second actuator for a pressure drop higher than a second threshold value; wherein the second threshold value is higher than the first threshold value.

Effects and features of this second aspect of the present invention are largely analogous to those described above in connection with the first aspect of the invention.

There is also provided a computer program for causing a processing unit to control a hydraulic system of a working machine according to the abovementioned method for controlling a hydraulic system, and a computer readable medium comprising said computer program.

Further features of and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

These and other aspects of the present invention will now be described in more detail with reference to the appended drawings showing an example embodiment of the invention, wherein.

DETAILED DESCRIPTION

In the present detailed description, various embodiments of a hydraulic system according to the present invention are mainly discussed with reference to a hydraulic system for a wheel loader. It should be noted that this by no means limits the scope of the present invention which is equally applicable to a hydraulic system in for example an excavator or a backhoe loader.

Figure 1:
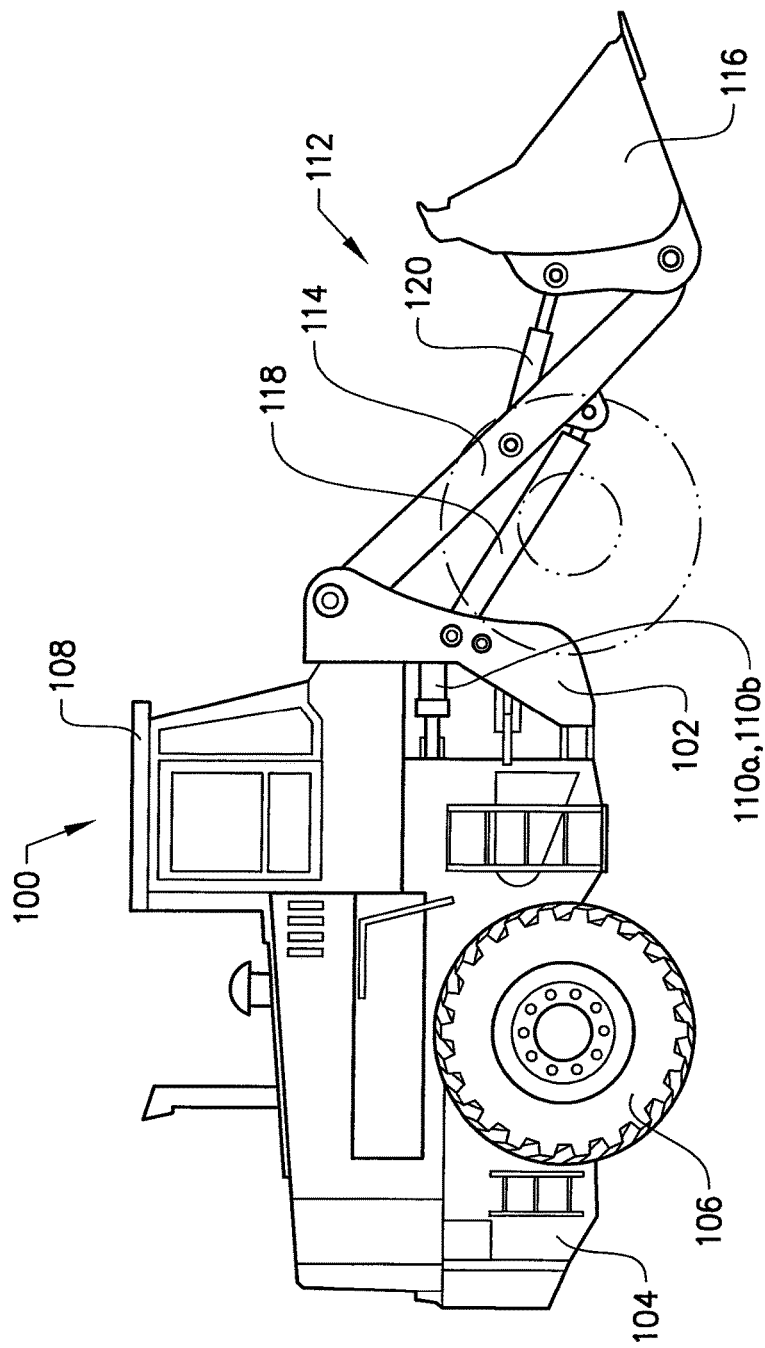
FIG. 1 schematically illustrates a working machine according to an embodiment of the invention.

FIG. 1 schematically illustrates a working machine 100 in the form of a wheel loader. The wheel loader 100 is to be considered an example of a working machine in which a hydraulic system according to embodiments of the present invention advantageously may be used. The wheel loader has a forward machine part 102 and a rear machine part 104. Each of these machine parts comprises a frame and wheels 106 arranged on an axle. The rear machine part 104 comprises a cab 108 for an operator of the wheel loader 100. The machine parts 102, 104 are connected to each other in such a way that they can pivot relative to each other about a vertical axis by means of two hydraulic cylinders (steering cylinders) 110a, 110b which are arranged between the machine parts 102, 104 and attached thereto. The hydraulic cylinders 110a, 110b are thus arranged one on each side of a centre line extending, in the longitudinal direction of the working machine 100 in order to turn or steer the wheel loader by means of the hydraulic cylinders. In other words, the wheel loader 100 is a so called frame-steered working machine.

The wheel loader comprises a lift arrangement 112 for handling different loads, such as objects or material. The lift arrangement 112 comprises a lift arm 114 in a first end pivotably connected to the forward machine part 102 in order to enable a lift motion of the arm 114. The lift arm 114 may also be referred to as a boom.

The lift arrangement 112 further comprises a tool 116 here represented by a bucket which is pivotably connected to a second end of the lift arm 114 in order to enable a tilt motion of the bucket 116 for example for emptying a load.

The lift arrangement 112 can be raised and lowered relative to the forward machine pan 102 of the vehicle by means of a hydraulic actuator, here a hydraulic cylinder (lift cylinder) 118. The hydraulic cylinder 118 is at a first end coupled to the forward machine part 102 and at the second end to the lift arm 114. The bucket 116 can be tilted relative to the lift arm 114 by means of a further hydraulic cylinder (tilt cylinder) 120, which at a first end is coupled to the lift arm 114 and at second end is coupled to the bucket 116.

The wheel loader 100 further comprises a drive line (not illustrated) which includes an engine, such as an internal combustion engine, torque converter, gear box etc. The engine can be arranged to supply power to the drive line for driving the wheels 106 and for driving hydraulic machines (pumps) in the hydraulic system by means of a power take off (PTO) which can be arranged at the drive line between the engine and the torque converter.

Figure 2:
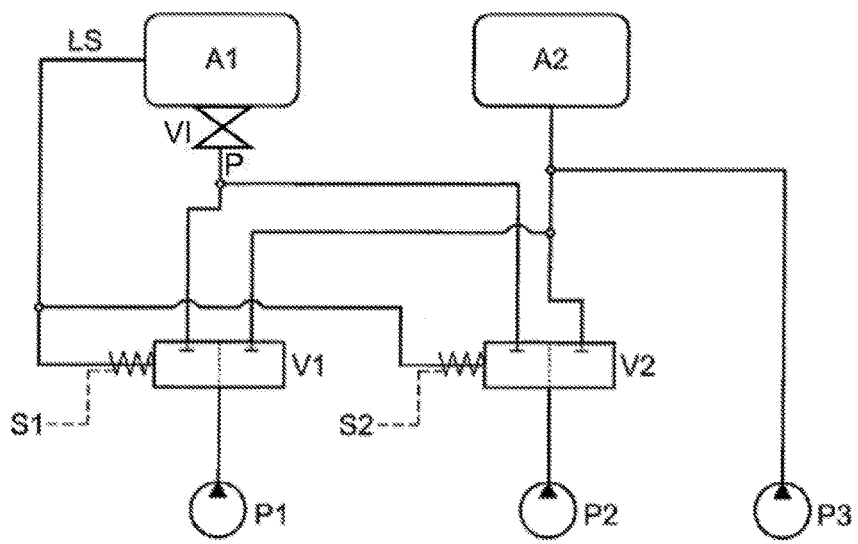
FIG. 2 schematically illustrates a hydraulic system according to an embodiment of the invention.

In, FIG. 2, a hydraulic system according to an embodiment of the invention is schematically illustrated. The hydraulic system comprises a first hydraulic actuator A1 for controlling a steering function and a second hydraulic actuator A2 for controlling a working function, such as a lift function, of the wheel loader 100. The hydraulic actuators A1 and A2 are here provided in the form of hydraulic cylinders with A1 corresponding to hydraulic cylinders 110a and 110b and A2 corresponding to hydraulic cylinder 118 in FIG. 1. The hydraulic cylinders also comprise valves for controlling the hydraulic action of the cylinders. The system further comprises a first, a second and a third hydraulic machine in the forth of fixed displacement hydraulic pumps, P1, P2 and P3 for providing a pressurized hydraulic fluid to the hydraulic cylinders 110, 110b and 18. P1 and P2 are each connected to both of the hydraulic cylinders A1 and A2 via first and second priority valves V1 and V2. The hydraulic pump P3 is only connected to the hydraulic cylinder A2 for providing additional lifting power when required. The hydraulic pumps are commonly directly driven by a motor, such as an internal combustion engine.

The hydraulic system has a means for transmitting a load sensing signal LS from the first hydraulic, cylinder A1 to each of the first priority valve V1 and the second priority valve V2. The load sensing signal LS corresponds to the pressure in the hydraulic cylinder A1. A load sensing signal may also be provided to the priority valve by means of a pressure sensor arranged in the hydraulic cylinder transmitting an electric control signal to an electric, pilot valve, which in turn provides a hydraulic control signal corresponding to the load sensing signal to the priority valves.

The priority valves are in turn controlled by the pressure drop $\Delta P$ defined as P-LS where P is the pressure prior to an inlet valve IV of the hydraulic cylinder A1. Thus, control signals corresponding to LS and P are provided to the priority valves. Alternatively, a control signal corresponding to the difference in pressure, $\Delta P$, is provided directly. The priority valves V1 and V2 are equipped with springs S1 and S2 having different spring bias such that the distribution of flow of hydraulic fluid is directed to the hydraulic cylinders A1 and A2 as a function of $\Delta P$ which will be further described below. As an alternative to using similar springs with a different spring bias, springs and having different spring constants may instead be used. The above described embodiment incorporating priority valves comprising springs is an example of how the general concept of the invention may be embodied. The person skilled in the art realizes that alternatively configured priority valves may be used while still performing the desired function of the invention.

Figure 3:
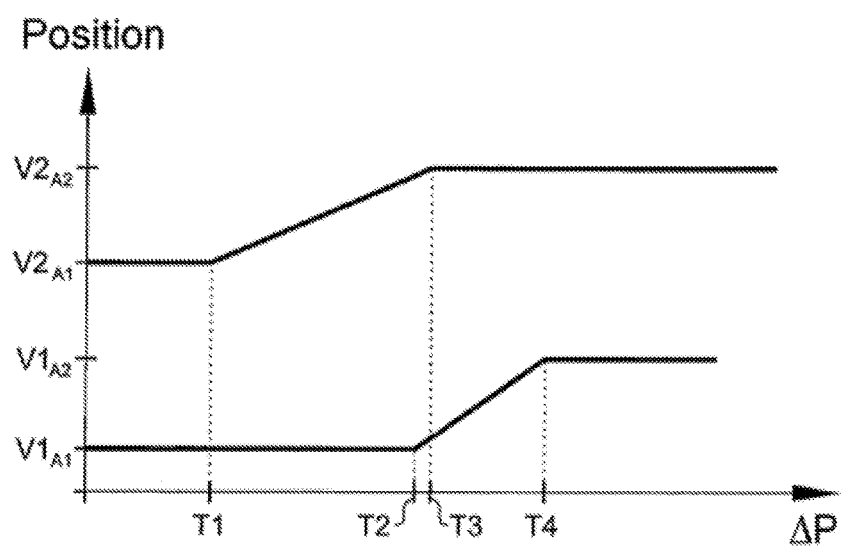
FIG. 3 is a graph schematically outlining a function of the hydraulic system of FIG. 2.

FIG. 3. Schematically illustrates the position of the two priority valves as a function of the pressure drop $\Delta P$ with reference to the components introduced in FIG. 2. $V1_A i$ corresponds to priority valve V1 being, open only to the hydraulic cylinder A1. In other words, the position V1A1 indicates that the flow of hydraulic fluid provided by pump P1 is provided only to the hydraulic, cylinder A1. Analogously. V A2 indicates that the priority valve is in a position where the flow of hydraulic fluid is directed only to the hydraulic cylinder A2. Likewise, V2A1 and $V2_{A2}$ indicate the positions of priority valve V2 as a function of $\Delta P$ where flow of hydraulic fluid is directed to A1 and A2, respectively. It should be noted that FIG. 3 is not drawn to scale and that the purpose of the graph is to illustrate the general function of the hydraulic system.

In a preferred embodiment of the hydraulic system, the priority valves V1 and V2 are configured such that the steering function of the wheel loader provided, by the hydraulic cylinder A1 is prioritized. For simplicity, only one hydraulic actuator, A1, is illustrated in FIG. 2.

When $\Delta P$ is below a first threshold value, T1, the priority valves V1 and V2 are in a position such that the flow from both pumps P1 and P2 are directed to hydraulic cylinder A1, i.e. to the steering, function. The position of the priority valves are determined by the relation between the spring bias, or by the spring constant, of springs S1 and S2 and the pressure drop $\Delta P$ such that for a $\Delta P$ below T1, the springs are fully extended and all flow through valves P1 and P2 are directed to A1.

For an increased pressure drop $\Delta P$ reaching above the threshold value T1, priority valve V2 begins to open for flow to the hydraulic cylinder A2.

When $\Delta P$ reaches a second threshold value T2, also V1 begins to allow flow of hydraulic fluid to the hydraulic cylinder A2. As $\Delta P$ is further increased, the flow of hydraulic fluid through V1 and V2 is gradually redirected from A1 to A2 so that for a predetermined range of $\Delta P$, both the steering hydraulics and lift hydraulics is receiving a flow from both P1 and P2.

If $\Delta P$ is above a third threshold value T3, the flow through priority valve T2 is directed only to the actuator A2 and when $\Delta P$ exceeds a fourth threshold value T4 the flow through priority valve V1 is directed only to the actuator A2. Thus, for a $\Delta P$ higher than T4, the springs S1 and S2 are fully compressed and all flow through valves P1 and P2 are directed to A2.

In an example embodiment of the invention, the threshold values for $\Delta P$ are: T1=15 bar, T2=17 bar, T3=19 bar and T4=21 bar.

Furthermore, a control system may be used to electrically control the function of the priority valves based on measured values of P and LS. Such a control system may comprise a computer program causing the control system to control the hydraulic system according to the above description.

The person skilled in the art realizes that the present invention by no means is limited to the preferred embodiments described above. On the contrary many modifications and variations are possible within the scope of the appended claims. For example, threshold values may be varied and selected based on the specific application at band.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The invention claimed is:

1. A hydraulic system for a work machine, comprising a first hydraulic actuator for controlling a first function and a second hydraulic actuator for controlling a second function, the first hydraulic actuator being provided with an inlet valve, the hydraulic system further comprising:
    a first hydraulic machine for providing hydraulic fluid to at least one of the first actuator and the second actuator via a first priority valve;
    a second hydraulic machine for providing hydraulic fluid to at least one of the first actuator and the second actuator of the working machine via a second priority valve;
    wherein each of the first priority valve and the second priority valve is configured to be controlled by a pressure drop over the inlet valve of the first actuator;
    wherein the pressure drop is measured as a difference between a pressure within the first actuator and a pressure upstream of the inlet valve such that when the pressure drop is lower than a first threshold value, a flow of hydraulic fluid is allowed only to the first actuator;

the second priority valve is further configured to allow a flow of hydraulic fluid to both of the first actuator and the second actuator for a pressure drop higher than the first threshold value;

the first priority valve is further configured to allow a flow of hydraulic fluid to both of the first actuator and the second actuator for a pressure drop higher than a second threshold value; and wherein the second threshold value is higher than the first threshold value.

2. The hydraulic system according to claim 1, wherein the second priority valve is further configured to allow a flow of hydraulic fluid only to the second actuator for a pressure drop higher than a third threshold value;

the first priority valve is further configured to allow a flow of hydraulic fluid only to the second actuator for a pressure drop higher than a fourth threshold value; and wherein the fourth threshold value is higher than the third threshold value.

3. The hydraulic system according to claim 2, wherein the third threshold value is higher than the second threshold value.

4. The hydraulic system according to claim 1, wherein the first function is a hydraulic steering system of the working machine.

5. The hydraulic system according to claim 1, wherein the second function is a hydraulic work system of the working machine.

6. The hydraulic system according to claim 1, wherein the first hydraulic machine is a first fixed displacement hydraulic pump.

7. The hydraulic system according to claim 1, wherein the second hydraulic machine is a second fixed displacement hydraulic pump.

8. The hydraulic system according to claim 7, wherein the second fixed displacement hydraulic pump has a larger displacement than the first fixed displacement hydraulic pump.

9. The hydraulic system according to claim 1, wherein the hydraulic system has a transmission arrangement for transmitting a load sensing signal from the first actuator to each of the first priority valve and the second priority valve.

10. The hydraulic system according to claim 1, further comprising a third hydraulic machine for providing hydraulic fluid to the second actuator.

11. The hydraulic system according to claim 1, wherein the first priority valve comprises a first spring and the second priority valve comprises a second spring, and wherein a position of each of the springs controls the output of the corresponding priority valve such that when the spring is fully extended, a flow of hydraulic fluid is allowed only to the first actuator, and when the spring is fully compressed a flow of hydraulic fluid is allowed only to the second actuator.

12. The hydraulic system according to claim 11, wherein the compression of the first spring and the second spring is controlled by the pressure drop over the inlet valve of the first actuator.

13. The hydraulic system according to claim 12, wherein the second priority valve is further configured to allow a flow of hydraulic fluid only to the second actuator for a pressure drop higher than a third threshold value;

the first priority valve is further configured to allow a flow of hydraulic fluid only to the second actuator for a pressure drop higher than a fourth threshold value;

wherein the fourth threshold value is higher than the third threshold value; and wherein the first spring is configured to be fully extended for a pressure drop lower than the second threshold value and to be fully compressed for a pressure drop higher than the fourth threshold value.

14. The hydraulic system according to claim 13, wherein the second spring is configured to be fully extended for a pressure drop lower than the first threshold value and to be fully compressed for a pressure drop higher than the third threshold value.

15. A method for controlling a hydraulic system of a working machine, the hydraulic system comprising a first hydraulic machine for providing hydraulic fluid to at least one of a first actuator and a second actuator via a first priority valve and a second hydraulic machine for providing hydraulic fluid to at least one of the first actuator and the second actuator via a second priority valve, the first hydraulic actuator being provided with an inlet valve, the method comprising:

controlling each of the first priority valve and the second priority valve to allow a flow of hydraulic fluid only to the first actuator if a pressure drop over the inlet valve of the first actuator is below a first threshold value: wherein the pressure drop is measured as a difference between a pressure within the first actuator and a pressure upstream of the inlet valve controlling the second priority valve to allow a flow of hydraulic fluid to both of the first actuator and the second actuator for a pressure drop higher than the first threshold value; and controlling the first priority valve to allow a flow of hydraulic fluid to both of the first actuator and the second actuator for a pressure drop higher than a second threshold value;

wherein the second threshold value is higher than the first threshold value.

16. The method according to claim 15, wherein the second priority valve is controlled to allow a flow of hydraulic fluid only to the second actuator for a pressure drop higher than a third threshold value;

the first priority valve is controlled to allow a flow of hydraulic fluid only to the second actuator for a pressure drop higher than a fourth threshold value;

wherein the fourth threshold value is higher than the third threshold value.

17. The method according to claim 16, wherein the third threshold value is higher than the second threshold value.

18. A computer comprising a computer program for causing a processing unit to control a hydraulic system of a working machine, the hydraulic system comprising a first hydraulic machine for providing hydraulic fluid to at least one of a first actuator and a second actuator via a first priority valve and a second hydraulic machine for providing hydraulic fluid to at least one of the first actuator and the second actuator via a second priority valve, the first hydraulic actuator being provided with an inlet valve, the computer program being configured to control the processing unit to:

control each of the first priority valve and the second priority valve to allow a flow of hydraulic fluid only to the first actuator if a pressure drop over the inlet valve of the first actuator is below a first threshold value;

wherein the pressure drop is measured as a difference between a pressure within the first actuator and a pressure upstream of the inlet valve control the second priority valve to allow a flow of hydraulic fluid to both of the first actuator and the second actuator for a pressure drop higher than the first threshold value;

control the first priority valve to allow a flow of hydraulic fluid to both of the first actuator and the second actuator for a pressure drop higher than a second threshold value;

wherein the second threshold value is higher than the first threshold value.

19. A non-transitory computer readable medium comprising a computer program for causing a processing unit to control a hydraulic system of a working machine, the hydraulic system comprising a first hydraulic machine for providing hydraulic fluid to at least one of a first actuator and a second actuator via a first priority valve and a second hydraulic machine for providing hydraulic fluid to at least one of the first actuator and the second actuator via a second priority valve, the first hydraulic actuator being provided with an inlet valve, the computer program being configured to cause the processing unit to:

control each of the first priority valve and the second priority valve to allow a flow of hydraulic fluid only to the first actuator if a pressure drop over the inlet valve of the first actuator is below a first threshold value: wherein the pressure drop is measured as a difference between a pressure within the first actuator and a pressure upstream of the inlet valve;

control the second priority valve to allow a flow of hydraulic fluid to both of the first actuator and the second actuator for a pressure drop higher than the first threshold value;

control the first priority valve to allow a flow of hydraulic fluid to both of the first actuator and the second actuator for a pressure drop higher than a second threshold value;

wherein the second threshold value is higher than the first threshold value.

* * * * *